United States Patent Office 2,832,754
Patented Apr. 29, 1958

2,832,754

ALKOXYSILYLPROPYLAMINES

Victor B. Jex, Kenmore, and Donald L. Bailey, Snyder, N. Y., assignors to Union Carbide Corporation, a corporation of New York No Drawing. Application January 21, 1955
Serial No. 483,421

3 Claims. (Cl. 260—46.5)

This invention relates to new organic compounds of silicon comprising alkoxysilylalkylamines. More particularly, the invention relates to new organic compounds of silicon comprising alkoxysilylpropylamines.

The new alkoxysilylpropylamines of the present invention have the empirical formula:

$$H_xN[CH_2CH_2CH_2Si(OR)_3]_{3-x}$$

where R is an alkyl group, and $x$ is an integer having a value of from 0 to 2. Examples of the alkyl groups which R may represent include methyl, ethyl, propyl, butyl and the like groups.

The new compounds of the instant invention, the trialkoxysilylpropylamines have been found especially useful as a size or finish for fibrous glass materials prior to the preparation of reinforced plastics. We have found that reinforced plastics, such as laminates, prepared from fibrous glass materials and those thermosetting resins which comprise the aldehyde condensation resins, the epoxy resins and the urethane resins, having a superior glass to resin bond are produced by subjecting the fibrous glass materials, prior to lamination, to a treatment with a compound within the scope of this invention.

An especially desirable property of the new compounds, the trialkoxysilylpropylamines, lies in their ability to form stable solutions with aqueous organic admixtures or with water. Consequently, these compounds make possible the sizing or finishing of fibrous glass materials without the necessity of employing costly anhydrous organic solvents which are oftentimes flammable.

When the alkoxysilylpropylamines are dissolved in water or in aqueous admixtures of organic compounds the alkoxy groups are hydrolyzed and subsequently condense to soluble aminopropylpolysiloxanes.

Trimethoxysilylpropylamine upon hydrolysis and condensation yields aminopropylpolysiloxane, characterized by the formula:

$$[H_2NCH_2CH_2CH_2—SiO_{3/2}]$$

The compounds of this invention also find use, by virtue of their amino and alkoxy groups, as starting materials in the synthesis of many organic compounds of silicon. For example, new and useful polymers may be prepared by reacting compounds, containing methylol groups, with the amino group of an alkoxysilylpropylamine to produce the corresponding substituted alkoxysilane which may be subsequently hydrolyzed and condensed to substituted polysiloxanes.

The compounds of the invention are prepared by the reaction of a gamma-chloropropylalkoxysilane with ammonia, under pressure, at elevated temperatures. The reaction which takes place may be illustrated by the following general equation:

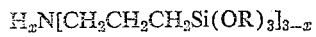

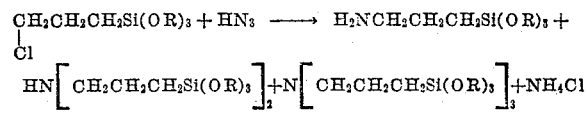

where R is an alkyl group. Examples of the alkyl groups which R may represent include methyl, ethyl, propyl, butyl and the like.

The reaction, by which the new compounds of our invention are prepared, is conducted in a suitable pressure vessel at temperatures of at least 90° C. and at pressures which are above atmospheric. The pressure employed may be autogenous or it may be applied by means of suitable equipment.

As indicated by the above general equation the products of the reaction are the mono, bis, and tris(alkoxysilylpropyl)amines. The proportions of the mono-, bis- and tris(alkoxysilylpropyl)amines obtained by the reaction may be controlled by the use of varying amounts of ammonia. The greater the mole fraction of ammonia in the reactants employed, the greater the proportion of the mono(alkoxysilylpropyl)amine in the product.

Our process may be conducted by charging a gamma-chloropropylalkoxysilane, such as gamma-chloropropyltripropoxysilane, and liquid ammonia to a pressure vessel and heating the mixture to a temperature of about 100° C. The products of the reaction are mono(tripropoxysilylpropyl)amine, bis(tripropoxysilylpropyl)amine and tris-(tripropoxysilylprophyl)amine. If the reactants are employed in a mole ratio of 10 moles ammonia per mole of gamma-chloropropylalkoxysilane, the yield of mono(alkoxysilylpropyl)amine, based on the starting silane is about 20 percent, while an increase in the amount of ammonia to about 20 moles ammonia per mole of gamma-chloropropylalkoxysilane will increase the yield of the mono(alkoxysilylpropyl)amine to about 50 percent.

The following examples are illustrative:

EXAMPLE 1

To a 300 ml. pressure vessel were charged 0.3 mole (72.2 grams) of gamma-chloropropyltriethoxysilane and 3.0 moles (51.0 grams) of liquid ammonia. The vessel was sealed and heated to a temperature of 100° C. for 12 hours. After heating, the vessel was cooled to room temperature and the excess ammonia gas, present in the vessel, bled off. Ethanol was then added to the above mixture and the resulting mixture filtered. The filtrate was fractionated through a Vigreux column under reduced pressure. Two fractions were obtained, the first consisted of ethanol and the second consisted of 31.5 grams of a material boiling at a temperature of from 80 to 120° C. under a presure of 4 mm. Hg absolute. The second fraction was refractionated through a packed column and there was obtained 12.4 grams of a material boiling at a temperature of 79–80° C. under a reduced pressure of 3 mm. Hg absolute. This material had a refractive index, $N_d^{25}$ of 1.4195 and a density of 0.936 gram per cc. at 25° C. Mono(triethoxysilylpropyl)amine was identified by the following analyses.

Table 1

| | Observed | Calculated for Mono (triethoxy-silylpropyl) amine |
|---|---|---|
| Molar Refraction | 59.18 | 59.69 |
| Neutralization Equivalent | 221.0 | 227.0 |
| Percent NH$_2$ | 7.2 | 7.0 |

A high boiling fraction, obtained in the second fractionation noted above, was not analyzed for bis(triethoxysilylpropyl)amine or for tris(triethoxysilylpropyl)amine content.

EXAMPLE 2

To a 3 liter pressure vessel were charged 1.5 moles (365 grams) of gamma-chloropropyltriethoxysilane and 15 moles (255 grams) of liquid ammonia. The vessel was sealed and heated to a temperature of 100° C. for a period of 12 hours. After heating the vessel was cooled to room temperature and the excess ammonia present in the vessel bled off. The residual products, which consisted of a liquid and a white solid, were removed from the vessel and filtered. The solid was then washed with anhydrous diethyl ether and discarded. The filtrate and washings were combined and fractionally distilled in a packed column under reduced pressure. Fractions were obtained at boiling temperatures of from; 100 to 110° C., (under 20 mm. Hg absolute), 145 to 150° C. (under 1 mm. Hg absolute) and 200 to 205° C. (under 1 mm. Hg absolute). Mono(triethoxysilylpropyl)amine, bis(triethoxysilylpropyl)amine, and tris(triethoxysilylpropyl)amine were identified by the following analyses.

| Fraction | Boiling Point, °C. | Refractive Index, $N_d^{25}$ | Yield (Percent) based on starting silane |
| --- | --- | --- | --- |
| I | 108–110° C. (20 mm.) | 1.4192–1.4208 | 21 |
| II | 145–150° C. (1 mm.) | 1.4280 | 30 |
| III | 200–205° C. (1 mm.) | 1.4322 | 14 |

NEUTRALIZATION EQUIVALENTS

| Fraction | Obtained | Calculated for Listed Amine |
| --- | --- | --- |
| I | 230.1 | 221.4-mono (triethoxysilylpropyl) amine. |
| II | 406.7 | 425.7-bis (triethoxysilylpropyl) amine. |
| III | 585.4 | 630.0-tris (triethoxysilylpropyl) amine. |

EXAMPLE 3

Following the procedure disclosed in Example 2 gamma-chloropropyltriethoxysilane and ammonia were reacted to a ratio of 20 moles liquid ammonia per mole of gamma-chloropropyltriethoxysilane. The yield of mono(triethoxysilylpropyl)amine obtained based on the starting silane was 50 percent.

EXAMPLE 4

To illustrate the polymeric nature of the hydrolyzed alkoxysilylpropylamines which form when aqueous solutions thereof are prepared the following procedure was conducted:

To a flask containing 100 grams of triethoxysilylpropylamine was slowly added 300 grams of distilled water. During the addition of the water the solution became cloudy and had the appearance of an oil emulsion. After the addition of all the water the solution was boiled under reflux during which time, one-half hour, the solution became homogeneous. During the course of reflux, ethanol was fractionally distilled off and the water present in the mixture evaporated under reduced pressure. There was obtained a clear glassy material which readily dissolved in water.

In an additional experiment the above procedure was followed with the exception that after the theoretical amount of alcohol resulting from hydrolysis and condensation was recovered from the hydroylsis step the resulting compound was dried and a solid brittle mass obtained. This solid was ground to a fine powder, dried under reduce pressure for several hours and analyzed. The following results were obtained:

Table 4

| | Si | N |
| --- | --- | --- |
| | Percent | Percent |
| Calcd. for $NH_2C_3H_6SiO_{3/2}$ | 25.5 | 12.7 |
| Found | 24.3 | 12.0 |

The aminopropylpolysiloxane obtained was then dissolved in water and a clear solution obtained. This solution was stored for several weeks at room temperature without change after which time it was employed as a sizing material for glass cloth. Atmospheric distillation of a weakly basic solution of the polymer gave a neutral distillate showing that no propylamine was formed and that there was no decomposition of the aminopropylpolysiloxane.

EXAMPLE 5

A No. 181 glass cloth, which had previously been subjected to heat cleansing, was immersed in a solution consisting of equal parts by weight of water and ethanol and containing 1.2 percent by weight of triethoxysilylpropylamine. After removal from solution, the glass cloth was drained and air dried at room temperature to remove the solvent therefrom. The amount by weight of the size contained by the glass cloth when calculated in terms of percent by weight of the cloth of aminopropylpolysiloxane was 0.83 percent (based on analytical data for combustible carbon on the sized cloth).

Laminates were prepared from a portion of the treated glass cloth by laying up, in accordance with customary practices, alternating layers of the cloth and a commercial melamine-aldehyde condensation polymer ("Melmac 405," a melamine resin sold by the American Cyanamide Co.) which resin was employed as a solution containing 50 percent solids by weight in a solvent consisting of 95 parts water and 5 parts butanol. The laminates thus laid up were precured at a temperature of about 125° C. for a period of about five minutes and thereafter subjected to a final curing treatment, at a temperature of 150° C., for a period of about ten minutes in a hydraulic press, equipped with electrically heated platens, at a pressure of 1000 pounds per square inch. The laminates comprised 13 plies and had a cured thickness of from 0.102 inch to 0.110 inch. It was calculated that the cured laminates contained about 45 percent by weight thereof of the melamine resin.

The laminates were evaluated by conducting tests of flexural strength on specimens cut from the material, one test being conducted on the material as cured and a second on a specimen that was subjected to boiling tap water for a period of two hours, cooled to room temperature in water and then tested wet. The flexural tests were carried out as described in Air Force Specification MILP–8013 (also Federal Specification LP–406a Method No. 1031). These tests were conducted by placing a specimen one inch by four inches on standardized supports, two inches apart, and the specimen then broken by a load applied midway between the two supports.

Similar dry and wet tests were conducted on non-sized glass cloth "Melmac 405" laminates of 13 ply. These laminates were of approximately the same thickness as those prepared from the sized glass cloth. The comparative results of the flexural tests appear in the table below.

Table 5

FLEXURAL STRENGTH

| | Dry, p. s. i. | Wet, p. s. i. | Percent Retention |
| --- | --- | --- | --- |
| Non-sized glass cloth laminate | 24,400 | 13,800 | 56.5 |
| Sized glass cloth laminate (treated with solution of triethoxysilylpropylamine) | 80,000 | 76,500 | 95.8 |

That the new compounds of this invention possess new and unexpected properties as compared with the known triethoxysilylmethylamines is illustrated by preparing water solutions of the latter compound and an alkoxysilylpropylamine within the scope of the present invention. For example, when 20 grams of triethoxysilylmethylamine are slowly added to 150 grams of distilled water, heat is evolved and a white solid formed during the addition. After all the water had been added the resulting mixture was heated to reflux. During heating additional white solid precipitated. The mixture was fractionally distilled to give a basic distillate which was found to be an aqueous ethanolic solution of methylamine. The methylamine present was identified as the hydrochloride salt which melted at 225 to 228° C. (Accepted literature melting point 226° C.). The white solid was filtered off, washed with water and dried. Microscopic examination of the solid before and after ignition at 1000° C. showed the solid to be silica.

As may be noted from Example 4, when triethoxysilylpropylamine is added to distilled water there results a stable homogeneous solution. This desirable property possessed by our new compounds, which property does not characterize the known alkoxysilylmethylamines, may be attributable to the stability of the carbon to silicon bonds of the alkoxysilylpropylamines. Specifically, the carbon to silicon bond between the aminoethyl and triethoxysilyl radicals of triethoxysilylmethylamine is extremely weak, and cleavage thereof occurs in the presence of moisture or water. Upon such cleavage there results a methylamine and a triethoxysilanol; and as shown above the latter compound readily hydrolyzes to a cross-linked insoluble solid. On the other hand, the bond between an aminopropyl radical and a triethoxysilyl radical is much stronger and cleavage thereof does not occur in the presence of moisture or water.

An attempt was made to prepare an alkoxysilylethylamine for the purpose of comparing the properties of such compound with an alkoxysilylmethylamine and an alkoxysilylpropylamine. However, we were unable to prepare an alkoxysilylethylamine. Specifically, the reaction between beta-chloroethyltriethoxysilane and ammonia under pressure and at elevated temperatures did not yield an alkoxysilylethylamine.

The noted stability of the carbon to silicon bond of the alkoxysilylpropylamines during hydrolysis was also unexpected in view of the teachings of the prior art concerning the hydrolysis of other substituted propylalkoxysilanes. For example, alkaline hydrolysis of gamma-chloropropylalkoxysilanes results in cleavage of the carbon to silicon bond and the formation of propane and a siloxane. Therefore, one would not expect that the corresponding aminopropylalkoxysilanes would possess a stronger carbon to silicon bond and would form stable solutions with water.

What is claimed is:
1. Triethoxysilylpropylamine.
2. An aminopropylpolysiloxane having the formula:

$$[H_2NCH_2CH_2CH_2SiO_{3/2}]$$

3. A process for preparing trialkoxysilylpropylamine which comprises reacting ammonia with gamma-chloropropyltrialkoxysilane in a mole ratio of at least 20 moles of ammonia per mole of gamma-chloropropyltrialkoxysilane at a temperature of at least 90° C. and at a pressure above atmospheric pressure.

References Cited in the file of this patent
UNITED STATES PATENTS

| | | |
|---|---|---|
| 2,715,133 | Speier | Aug. 9, 1955 |
| 2,738,357 | Speier | Mar. 13, 1956 |
| 2,754,311 | Elliott | July 10, 1956 |
| 2,762,823 | Speier | Sept. 11, 1956 |

FOREIGN PATENTS

| | | |
|---|---|---|
| 513,521 | Belgium | Aug. 30, 1952 |

OTHER REFERENCES

Sommer et al.: "Jour. Am. Chem. Soc.," vol. 68 (1946), pp. 488–489.

Noll et al.: "Jour. Am. Chem. Soc.," vol. 73 (1951), pp. 3867–3871.

Noll et al.: "Jour. Am. Chem. Soc.," vol. 73 (1951), pp. 3871–3873.

Sommer et al.: "Jour. Am. Chem. Soc.," vol. 73 (1951), pp. 5130–5134.